United States Patent
Seselj (10) Patent No.: US 12,255,766 B2
(45) Date of Patent: *Mar. 18, 2025

(54) SYSTEM AND METHOD FOR INTEGRATION OF DYNAMIC EMBEDDED PROCESS COMMUNICATIONS

(71) Applicant: Nintex USA, Inc., Bellevue, WA (US)

(72) Inventor: Ivan Zlatko Seselj, Auckland (NZ)

(73) Assignee: Nintex USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,140

(22) Filed: Nov. 28, 2023

(65) Prior Publication Data

US 2024/0097963 A1    Mar. 21, 2024

Related U.S. Application Data

(63) Continuation of application No. 16/722,601, filed on Dec. 20, 2019, now Pat. No. 11,870,635.

(60) Provisional application No. 62/784,273, filed on Dec. 21, 2018.

(51) Int. Cl.
| | |
|---|---|
| *G06F 15/16* | (2006.01) |
| *H04L 41/0266* | (2022.01) |
| *H04L 41/0813* | (2022.01) |
| *H04L 67/02* | (2022.01) |
| *H04L 67/53* | (2022.01) |

(52) U.S. Cl.
CPC ...... *H04L 41/0266* (2013.01); *H04L 41/0813* (2013.01); *H04L 67/02* (2013.01); *H04L 67/53* (2022.05)

(58) Field of Classification Search
CPC . H04L 41/0266; H04L 41/0813; H04L 67/02; H04L 67/10; H04L 67/20
See application file for complete search history.

(56) References Cited

U.S. PATENT DOCUMENTS

| | | |
|---|---|---|
| 8,140,642 B1 | 3/2012 | Kadam et al. |
| 8,881,180 B1 | 11/2014 | Srikanth et al. |
| 11,870,135 B2 * | 1/2024 | Saleh ............ H01Q 9/065 |
| 11,870,635 B2 | 1/2024 | Seselj |
| 2005/0010454 A1 | 1/2005 | Falk et al. |
| 2008/0172414 A1 | 7/2008 | Tien et al. |
| 2009/0199133 A1 | 8/2009 | Deutsch et al. |

(Continued)

*Primary Examiner* — Yves Dalencourt
(74) *Attorney, Agent, or Firm* — Perkins Coie LLP (57) ABSTRACT

Disclosed here are systems and methods for integration of third-party, dynamic embedded processes into a single process residing within a server or network. The disclosed technology enables entities and third-party service providers to communicate and share data and processes with each other on a single platform, which a user can engage with to access both the embedded processes and other processes internal to the platform. Integration of embedded-process communications also generates visualization of the processes between the entities responsible for completion of the process and the third-party service providers they engage to assist them in its completion. Sharing processes and relaying corresponding data between entities, third parties, and users is live and continually updated. This allows for information to be transmitted to/from various different parties and allows for live application of any changes in process or data.

20 Claims, 4 Drawing Sheets

(56) References Cited

U.S. PATENT DOCUMENTS

| | | |
|---|---|---|
| 2011/0280549 A1 | 11/2011 | Walker et al. |
| 2014/0149565 A1 | 5/2014 | Piegay et al. |
| 2017/0257216 A1 | 9/2017 | Perga |
| 2020/0201496 A1 | 6/2020 | Wong |
| 2021/0297923 A1 | 9/2021 | Wei et al. |

* cited by examiner

SYSTEM AND METHOD FOR INTEGRATION OF DYNAMIC EMBEDDED PROCESS COMMUNICATIONS

CROSS-REFERENCE TO RELATED APPLICATION(S)

This application is a continuation of U.S. application Ser. No. 16/722,601, filed Dec. 20, 2019, which claims benefit to U.S. Provisional Application No. 62/784,273, filed on Dec. 21, 2018, entitled "System and Method for Integration of Dynamic Embedded Process Communications" the contents of which are incorporated by reference herein as though set forth in their entirety, and to which priority and benefit are claimed.

FIELD OF USE

The present disclosure relates generally to the field of communication technology between separate networks. More specifically, this disclosure relates to systems and methods for the improved integration of third-party activity as embedded processes within internal servers and networks, and for the improved collaboration between the third parties and users of the embedded processes and its contents.

BACKGROUND

As the internal responsibilities and demands of companies grow, so do the intricacies of the business processes to meet those responsibilities and demands. As a result, it is now common for organizations to involve multiple, separate service providers in running the increasing number of business processes. This may take the form of engaging outsourced service providers to run a portion of a business or running service contracts to perform specific duties within a business. Although both external and internal parties can share the same platform, oftentimes service providers' existing technology to directly act on processes is separate from, and external to, the technology of the business entities they serve. This limits service providers in being able to efficiently address and complete processes for other entities. Adding to this gap in communication capabilities and accessibility of entities' processes is the constant change of the state of the processes and of the data inputted into them. Oftentimes, these changes are known by only one of the parties involved. Such changes, if gone unchecked, result in errors, wasted time, and confusion between the service providers and those they serve. Additional hindrances resulting from existing technology comprise: murkiness between who may or can make changes to the processes; disputes regarding ownership of the intellectual property of the processes and the underlying data; authority to delegate regarding the maintenance of the processes; unclear determination of accountability when disputes arise from failed processes; and the lack of convenient visualization of the governance of the processes.

Thus, what is needed are systems and methods that improve communication technology between the networks and servers of separate parties, allowing for effective understanding, implementation, and engagement of business processes—such as workflows—across organizational boundaries. Improved communication technology should also comprise visualization tools that enable users to search for, control access to, collaborate, review, improve, fix, and manage these processes. In doing so, transparency of responsibilities, accountability, and ownership of intellectual property must be retained.

SUMMARY OF THE DISCLOSURE

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for integration of dynamic embedded process communications, which may be utilized between companies and third parties, such as partners and general contract services. The disclosed technology enables entities and any number of third-party service providers to communicate and share data, knowledge, and processes with each other on a single platform; which a user can then engage with when completing processes. The disclosed technology thus enables entities and third parties to work jointly in serving a common customer or addressing a common process. Integration of embedded process communications also generates visualization of the business processes between the entities responsible for completion of the process and the third-party service providers they engage to assist them in its completion. Visualization capabilities permit entities to determine where service providers sit within the overall business process, while allowing service providers to deliver relevant data, such as work instructions and guidance, in a visual format that is readable by a user within the entity's system. Sharing processes and relaying corresponding data between entities, third parties, and users is live and continually updated. This allows for information to be transmitted to/from various different parties and allows for live application of any changes in process or data.

In one embodiment, a computer-implemented method for integration of an embedded process communication comprises: enabling network sharing with a first computer system; receiving an embeddable-process link from the first computer system; generating at least one actionable configuration from the received embeddable-process link, wherein the actionable configuration comprises at least one of: an executable process step, an executable process, or combinations thereof; integrating the actionable configuration into a second computer system; and displaying the integrated actionable configuration on the second computer system, wherein the second computer system is configured to terminate the network sharing with the first computer system upon occurrence of at least one of: the actionable configuration receiving data input, passage of a configured amount of time, manual selection of termination, or combinations thereof.

The disclosure thus allows for the generation of an information platform—compiling and sharing information in a controlled way—that users can incorporate when carrying out processes. This allows for a single point of authentication for the entity as it receives information from third parties and other sources, while also allowing the third party to control the information on their own platform.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
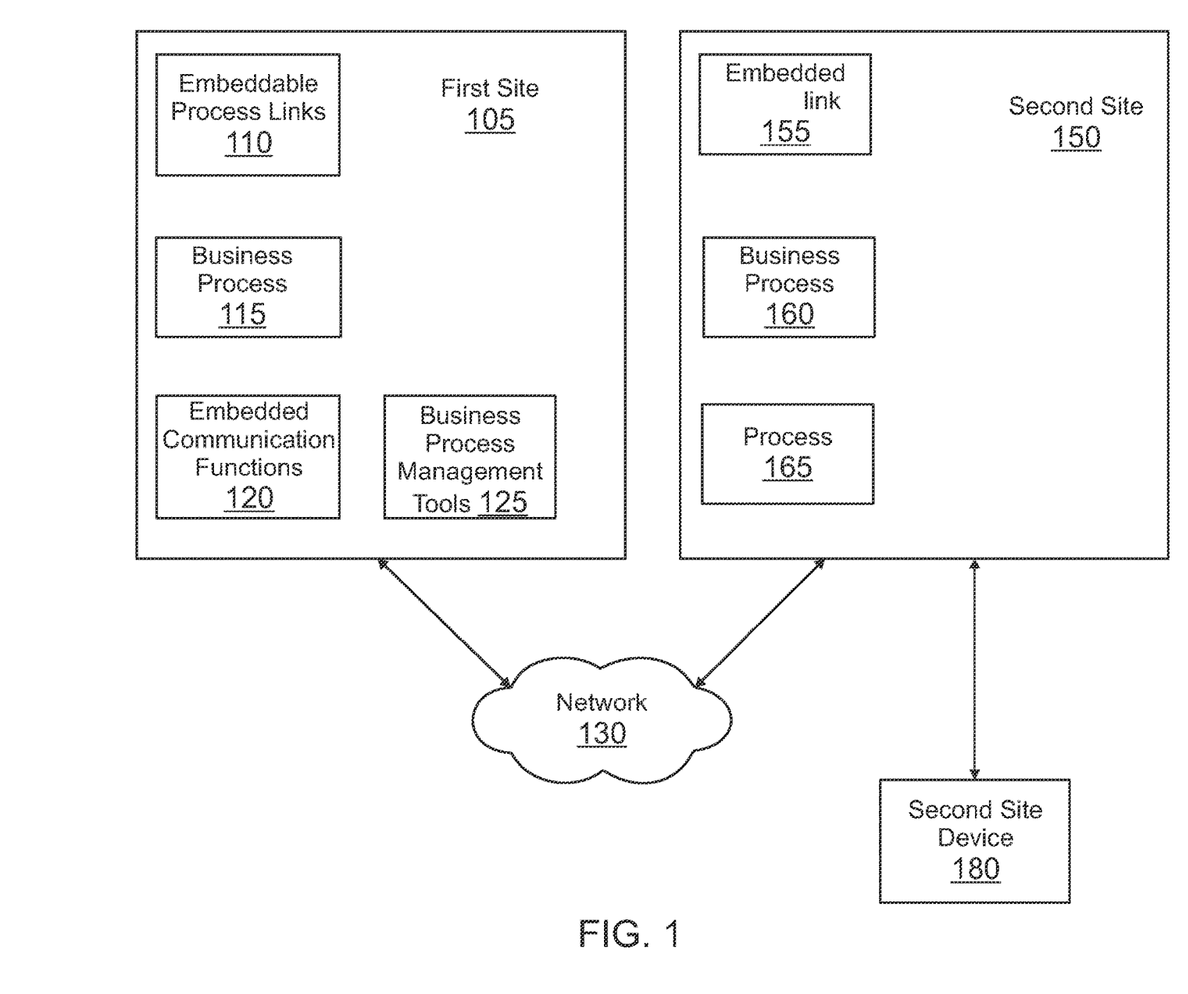
FIG. 1 is a functional block diagram generally illustrating an embodiment of a network system for integration of embedded process communications.

FIG. 1 is a functional block diagram generally illustrating an embodiment of a network system for integration of embedded process communications ("embedded communications") within business processes. The embedded communications may comprise communication between a first site 105 and a second site 150 through a network 130. Embodiments of a first site 105 may be service providers that provide services such as updating human resource requirements, streamlining audits, managing risks, enhancing reporting capability, simplifying business administration and operations, identifying opportunities for improving efficiency, reviewing and modifying business processes, and adhering to quality and compliance standards. An embodiment of a second site 150 may comprise an entity that delegates specific tasks or portions of business processes to service providers. An embodiment of a business process is a workflow. An embodiment of the relationship between a first site 105 and a second site 150 may comprise the first site 105 being a third-party service provider that completes part of a process, such as steps 1-3, and a second site 150 being a company that internally completes steps 4-6. In another embodiment, the first site 105 may complete steps 1-3, the second site 150 completes steps 4-6, and the first site 105 then completes steps 7-10. In another embodiment, a first site 105 may be a third party service provider that completes steps 1-3, the second site 150 may be an organization that internally completes steps 4-6, and steps 7-10 are completed by a first site 105 third party that is different from and separate to the third party that completed steps 1-3. Put simply, a process, and the varying steps that make up the process, may be completed by a combination of the entity and any number of different third parties.

The first site 105 may comprise the capability to generate embeddable process links 110, its own business processes 115, embedded communication functions 120, and other business process management tools 125. A second site 150 may comprise the capability to receive embedded links 155, generate its own business processes 160, and the capability to generate a new process 165 upon data from the received embedded link 155. The second site 150 may be configured to communicate with a second-site device 180, wherein the second-site device 180 has access to the process 165 and may act on actions within the process 165.

Figure 2:
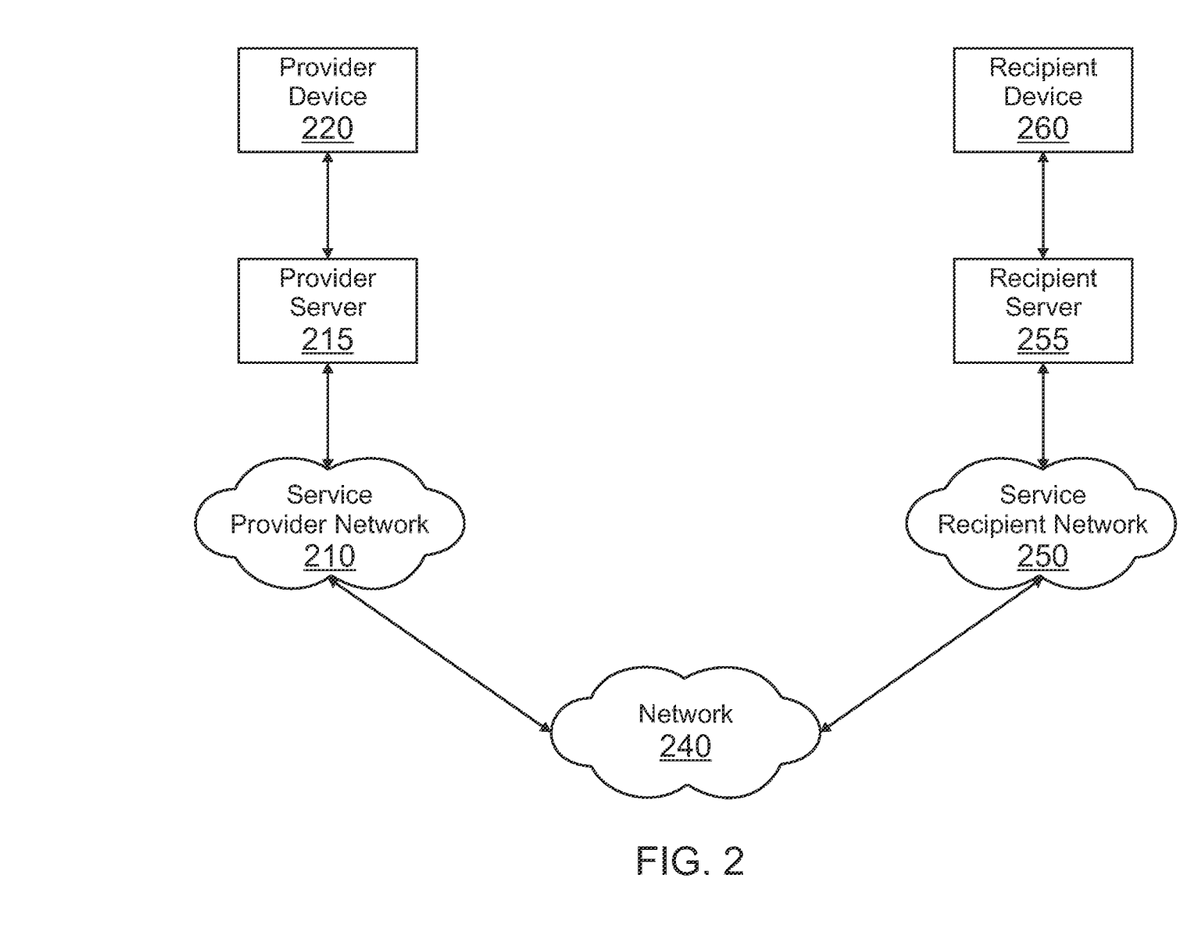
FIG. 2 is a functional block diagram generally illustrating an embodiment of a network system for integration of embedded process communications between a service provider and a service recipient.

FIG. 2 is a functional block diagram generally illustrating an embodiment of a network system for integration of embedded process communications between a service provider and a service recipient. In one embodiment, a service provider network 210 may communicate with a service recipient network 250 via a general network 240. The service provider network 210 may communicate directly with its own server 215 and devices 220. The service recipient network 250 may communicate directly with its own server 255 and devices 260.

Figure 3:
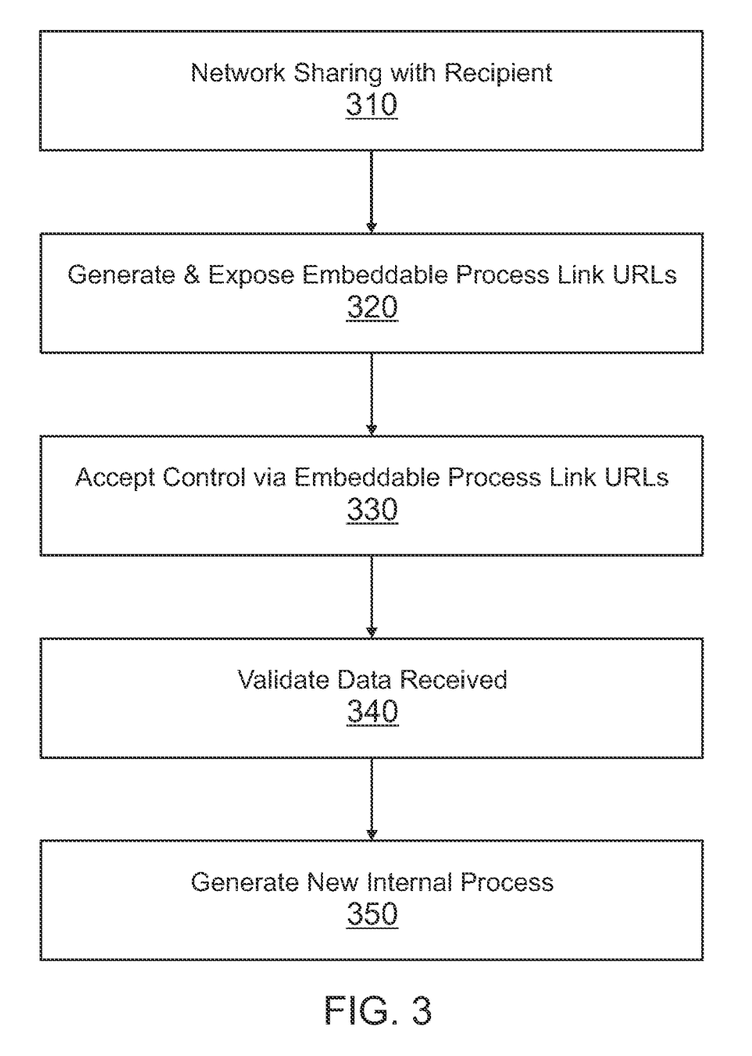
FIG. 3 is a flow diagram generally illustrating an embodiment of integration of embedded process communications between a service provider and a service recipient.

FIG. 3 is a flow diagram generally illustrating an embodiment of integration of embedded process communications between a service provider and a service recipient. In one embodiment, a service provider network may begin embedded process communications with a recipient by enabling network sharing 310 with the recipient network. Once network sharing is enabled, the provider site may generate and expose 320 embeddable process link URLs in its own site, which can be copied and shared. The recipient site may then accept control 330 of the URL, which it can validate 340 prior to displaying a process and its data. Following any validation, the recipient site may generate and display 350 a new process based on the data accepted, or update its processes based on the content accepted. In another embodiment, once network sharing is enabled, a recipient site may receive a shell link that is then recreated in the recipient site. The shell link may be both embedded into the recipient's process and the provider's site. The shell link can include metadata, which may comprise the process title, a summary, background, and process owner contact details. The recipient site may, along with validating 340 the URL prior to displaying a process and its data, also validate metadata received. Metadata received represents searchable information and may be searchable within the recipient's site. Such searchable information can assist the recipient site users in searching for relevant information.

In one embodiment, the service recipient may select to not distinguish the service provider's content from its own. For example, when a non-administrative user is in the recipient site, the recipient may select to have its generated process be visually indistinguishable from the recipient's own internal processes. The generated process may also be indistinguishable in the manner it is accessed and used. For example, it may be searchable, navigable, and readable in much the same way as the internal processes. The content received from the service provider site may also be visually indistinguishable from the recipient's internal content. In another embodiment, the service recipient may select to distinguish the service provider's content from its own or highlight processes owned by third parties. This may be done, for example, by incorporating a different logo on the process map.

However, both the generated processes and the service-provider site's content are distinguishable from the recipient's internal processes in that they are processes and content embedded in the recipient's site, stemming from the actual process or content within the service provider's site. The generated process may also vary in the quantity or substance of the content when compared to internal processes. As changes are made to the contents of the generated process, those changes are dynamically updated in both the provider and recipient's sites.

The disclosure presented herein improves the functionalities of machines, computers, and other electronic devices by enabling a user to access and use an external business process or the process's results within the user's own network, server, or site, without incurring any interruption, conflict, or visual changes from its own internal processes. Improvements may also comprise live updating of a process's content, seen by at least both the first site and the second site; adding layers of control depending on a variety of factors (such as user identity, timing, value, authority); and viewing or tracking use of the processes. The disclosure thus allows for a network of organizations to directly communicate and collaborate with each other "behind the scenes" without impediments, technically or visually, to each organization's own procedures. As a result, the disclosure creates an information platform—sharing information in a controlled way and displaying it in an easy to understand manner.

In another embodiment, once a second site creates a new process using an embeddable link from a first site, the second site may retrieve and store process metadata, such as a process's title, source site name, search keywords, objectives, and background. In one embodiment, collaboration between separate entities may allow an entity to obtain a process from a large organization and collaborate with the owners and experts related to the process. Additionally, users may find embedded processes by navigating through the second site process group hierarchy or by a search of the second site. Processes may be embedded into an organization's intranet, customer relationship management software, mobile applications, enterprise resource planning software, and an organization's transaction menus and portals.

In one embodiment, governance controls for the creation, placement, management, and termination of a process and its content, reside with the site that is the source of the process. Only the source site may control and change the process and its content and data. A recipient site may suggest improvements to the source site, such as via email, but only the source site may have control. Governance controls may also prevent a user from making changes to the process, while still providing alternative options or solutions.

In another embodiment, upon the completion of a process, fulfillment of contractual obligations between users, or any other action that shows finality in the use of a process, embedded communications capabilities may allow for the automatic or manual termination of a process, its content, or its results. Embedded communications capabilities may also allow for the extinguishing of process access.

In another embodiment, embedded communications capabilities may comprise analytical capabilities, such that users may get insight into the efficiency and effectiveness of their business processes, the steps within the processes, content within the processes, and the data stemming from the processes' content. Analytical capabilities may log what processes have been shared between various parties and generate relevant data stemming from the use of the processes, such as how many times a page has been visited, stakeholders involved, time it takes to carry out a process, associated costs, service level tracking, tracking hits, and compliance requirements.

Figure 4:
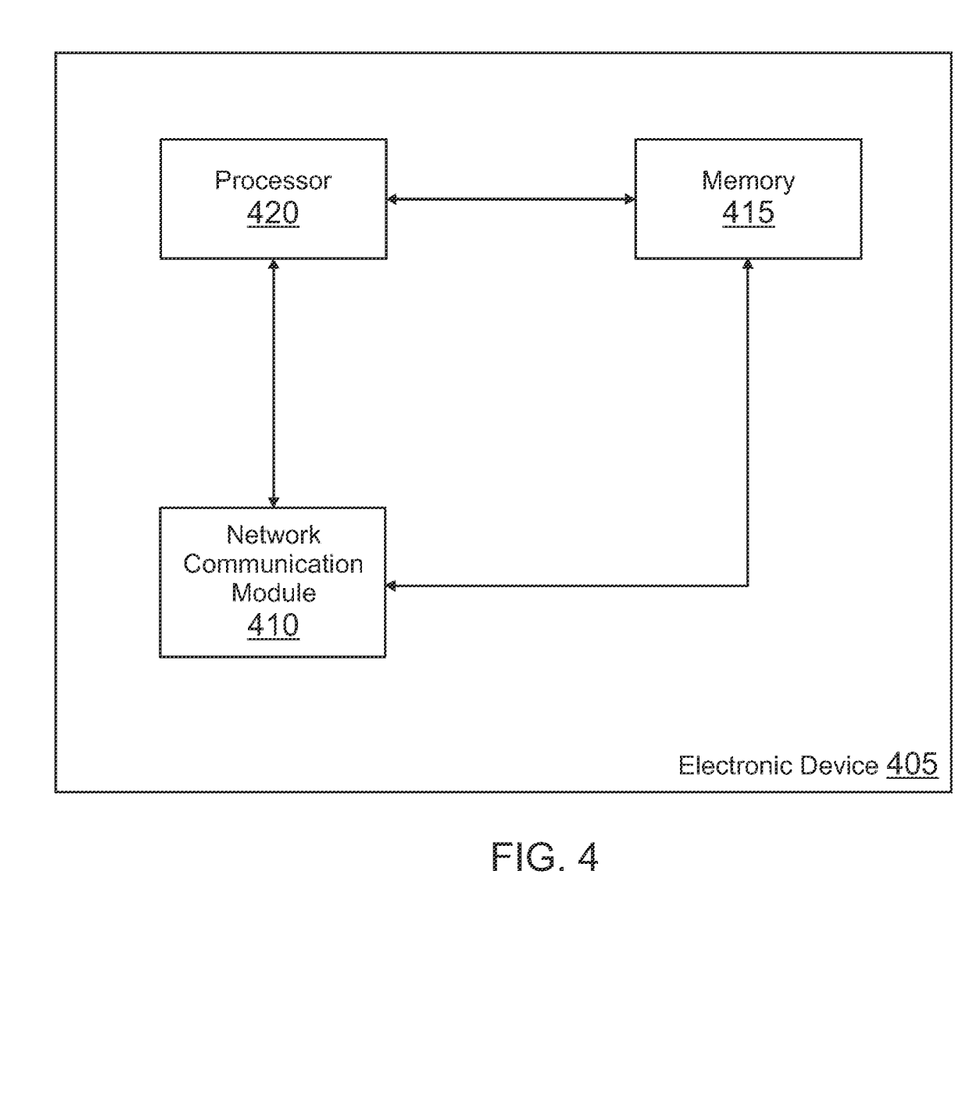
FIG. 4 is a functional block diagram generally illustrating an embodiment of an electronic device system of an integration of embedded process communications.

FIG. 4 is a functional block diagram generally illustrating an embodiment of an electronic device system of an integration of embedded process communications. The electronic device 405 may comprise a network communications module 410, which allows for connection to a server with embedded process communication capability or other servers or networks. The electronic device 405 may further comprise a memory 415, and a processor 420. The electronic device 405 is not limited to any particular configuration or system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order; it is in no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

What is claimed:

1. A computer-implemented method for integration of an embedded-process communication, comprising:
   enabling network sharing between a first computer system and a second computer system;
   transmitting, by the second computer system, an embeddable-process link to the first computer system;
   receiving, by the second computer system, at least one actionable configuration from the first computer system,
      wherein the at least one actionable configuration is generated using the embeddable-process link, and
      wherein the at least one actionable configuration comprises at least one of: an executable process step, an executable process, or combinations thereof;
   integrating the at least one action configuration into the second computer system; and
   terminating the network sharing between the first computer system and the second computer system upon occurrence of at least one of: the at least one actionable configuration receiving data input, passage of a configured amount of time, manual selection of termination inputted into the second computer system, or combinations thereof.

2. The method of claim 1, further comprising:
   receiving, by the second computer system, a revised actionable configuration,
      wherein the revised actionable configuration is generated based on data transmitted from the first computer system to the embeddable-process link;
   integrating the revised actionable configuration into the second computer system; and
   displaying the integrated revised actionable configuration at the second computer system.

3. The method of claim 1, further comprising: displaying, at the second computer system, the integrated at least one action configuration.

4. The method of claim 1, further comprising:
   responsive to the at least one actionable configuration receiving data input, transmitting, by the second computer system, the received data input to the first computer system.

5. The method of claim 1, wherein the embeddable-process link comprises metadata, wherein the metadata comprises information that is searchable within the second computer system.

6. The method of claim 1, wherein the embeddable-process link comprises metadata, wherein the metadata comprises at least one of: a process title, a summary, background information, or process owner contact details.

7. The method of claim 1, wherein the embeddable-process link comprises metadata, and wherein the method further comprises:
   responsive to successful validation of the metadata, displaying, at the second computer system, the integrated at least one action configuration.

8. The method of claim 1, further comprising:
   displaying, at the second computer system, information related to the integrated at least one action configuration,
      wherein information related to the integrated at least one action configuration is visually indistinguishable from one or more processes of the second computer system.

9. The method of claim 1, wherein the first computer system is associated with at least one first party, and wherein the second computer system is associated with a second party distinct from the at least one first party.

10. The method of claim 9, wherein the at least one first party comprises at least one third party service provider.

11. At least one non-transitory, computer-readable medium carrying instructions, which when executed by at least one data processor, performs operations for integration of an embedded-process communication, the operations comprising:
   responsive to enablement of network sharing between a first computer system and a second computer system, transmitting, by the second computer system, an embeddable-process link to the first computer system;
   receiving, by the second computer system, at least one actionable configuration from the first computer system,
      wherein the at least one actionable configuration is generated using the embeddable-process link, and
      wherein the at least one actionable configuration comprises at least one of: an executable process step, an executable process, or combinations thereof;

integrating the at least one action configuration into the second computer system; and terminating the network sharing between the first computer system and the second computer system upon occurrence of at least one of: the at least one actionable configuration receiving data input, passage of a configured amount of time, manual selection of termination inputted into the second computer system, or combinations thereof.

12. The at least one non-transitory, computer-readable medium of claim 11, wherein the operations further comprise:

receiving, by the second computer system, a revised actionable configuration,
wherein the revised actionable configuration is generated based on data transmitted from the first computer system to the embeddable-process link;
integrating the revised actionable configuration into the second computer system; and
displaying the integrated revised actionable configuration at the second computer system.

13. The at least one non-transitory, computer-readable medium of claim 11, wherein the operations further comprise: displaying, at the second computer system, the integrated at least one action configuration.

14. The at least one non-transitory, computer-readable medium of claim 11, wherein the operations further comprise:

responsive to the at least one actionable configuration receiving data input, transmitting, by the second computer system, the received data input to the first computer system.

15. The at least one non-transitory, computer-readable medium of claim 11, wherein the embeddable-process link comprises metadata, wherein the metadata comprises information that is searchable within the second computer system.

16. The at least one non-transitory, computer-readable medium of claim 11, wherein the embeddable-process link comprises metadata, wherein the metadata comprises at least one of: a process title, a summary, background information, or process owner contact details.

17. The at least one non-transitory, computer-readable medium of claim 11, wherein the embeddable-process link comprises metadata, and wherein the operations further comprise:

responsive to successful validation of the metadata, displaying, at the second computer system, the integrated at least one action configuration.

18. The at least one non-transitory, computer-readable medium of claim 11, wherein the operations further comprise:

displaying, at the second computer system, information related to the integrated at least one action configuration, wherein information related to the integrated at least one action configuration is visually indistinguishable from one or more processes of the second computer system.

19. A system for integration of an embedded-process communication comprising a non-transitory computer-readable medium having instructions stored thereon, which when executed by one or more processors of the system cause the system to:

upon enablement of network sharing between a first computer system and a second computer system, transmit, by the second computer system, an embeddable-process link to the first computer system;

receive, by the second computer system, at least one actionable configuration from the first computer system,
wherein the at least one actionable configuration is generated using the embeddable-process link, and
wherein the at least one actionable configuration comprises at least one of: an executable process step, an executable process, or combinations thereof;

integrate the at least one action configuration into the second computer system; and terminate the network sharing between the first computer system and the second computer system upon occurrence of at least one of: the at least one actionable configuration receiving data input, passage of a configured amount of time, manual selection of termination inputted into the second computer system, or combinations thereof.

20. The system of claim 19, wherein the instructions, when executed by the one or more processors of the system further cause the system to:

display, at the second computer system, information related to the integrated at least one action configuration,
wherein information related to the integrated at least one action configuration is visually indistinguishable from one or more processes of the second computer system.

* * * * *